(12) United States Patent
Ciaccio et al.

(10) Patent No.: US 10,886,583 B2
(45) Date of Patent: Jan. 5, 2021

(54) BATTERY AND CAPACITOR ASSEMBLY FOR A VEHICLE AND A METHOD FOR HEATING AND COOLING THE BATTERY AND CAPACITOR ASSEMBLY

(71) Applicant: GENTHERM INCORPORATED, Northville, MI (US)

(72) Inventors: Michael Peter Ciaccio, Chelsea, MI (US); Brian Moorhead, Willis, MI (US)

(73) Assignee: Gentherm Incorporated, Northville, MI (US)

( * ) Notice: Subject to any disclaimer, the term of this patent is extended or adjusted under 35 U.S.C. 154(b) by 718 days.

(21) Appl. No.: 15/208,143

(22) Filed: Jul. 12, 2016

(65) Prior Publication Data
US 2017/0256833 A1    Sep. 7, 2017

Related U.S. Application Data

(60) Provisional application No. 62/302,386, filed on Mar. 2, 2016.

(51) Int. Cl.
*H01M 10/6572* (2014.01)
*H01M 10/04* (2006.01)
(Continued)

(52) U.S. Cl.
CPC ......... *H01M 10/6572* (2015.04); *B60L 50/66* (2019.02); *B60L 58/15* (2019.02);
(Continued)

(58) Field of Classification Search
CPC ..... H01M 10/60–667; H01G 11/00–12; H01G 11/78
See application file for complete search history.

(56) References Cited

U.S. PATENT DOCUMENTS 6,124,690 A * 9/2000 Yano ................. B60K 6/28
318/376
6,202,615 B1   3/2001 Pels et al.
(Continued)

FOREIGN PATENT DOCUMENTS

DE      4028242 A1   3/1992
DE     19628222 A1   1/1998
(Continued)

OTHER PUBLICATIONS

Kerns, J. (May 11, 2015). What's the Difference Between Batteries and Capacitors? Retrieved from https://www.machinedesign.com/batteriespower-supplies/what-s-difference-between-batteries-and-capacitors (Year: 2015).*

(Continued)

*Primary Examiner* — Jonathan Crepeau
*Assistant Examiner* — Jacob Buchanan

(57) ABSTRACT

In one example, the present disclosure describes a battery and capacitor assembly for a hybrid vehicle that includes a plurality of battery cells, a plurality of capacitor cells, a cooling plate, a pair of end brackets, and a housing. The plurality of capacitor cells are arranged adjacent to the plurality of battery cells such that the plurality of battery cells and the plurality of capacitor cells form a cell stack. The pair of end brackets are disposed at opposite ends of the cell stack and are attached to the cooling plate. The pair of end brackets compress the plurality of battery cells and the plurality of capacitor cells. The housing is attached to the cooling plate and encloses the cell stack and the pair of end brackets.

28 Claims, 6 Drawing Sheets

(51) Int. Cl.
| | |
|---|---|
| H01M 10/615 | (2014.01) |
| H01M 10/052 | (2010.01) |
| H01M 10/613 | (2014.01) |
| H01M 10/617 | (2014.01) |
| H01M 2/10 | (2006.01) |
| H01G 11/08 | (2013.01) |
| H01M 10/647 | (2014.01) |
| H01M 10/6555 | (2014.01) |
| H01M 10/6556 | (2014.01) |
| H01M 16/00 | (2006.01) |
| B60L 50/60 | (2019.01) |
| B60L 58/26 | (2019.01) |
| B60L 58/27 | (2019.01) |
| B60L 58/15 | (2019.01) |
| H01M 10/625 | (2014.01) |
| H01G 11/18 | (2013.01) |
| H01G 11/82 | (2013.01) |
| H01M 10/42 | (2006.01) |
| H01M 10/48 | (2006.01) |
| H01M 10/0525 | (2010.01) |
| B60L 7/10 | (2006.01) |

(52) U.S. Cl.
CPC ............... *B60L 58/26* (2019.02); *B60L 58/27* (2019.02); *H01G 11/08* (2013.01); *H01G 11/18* (2013.01); *H01G 11/82* (2013.01); *H01M 2/1077* (2013.01); *H01M 10/0481* (2013.01); *H01M 10/052* (2013.01); *H01M 10/4257* (2013.01); *H01M 10/4264* (2013.01); *H01M 10/482* (2013.01); *H01M 10/486* (2013.01); *H01M 10/613* (2015.04); *H01M 10/615* (2015.04); *H01M 10/617* (2015.04); *H01M 10/625* (2015.04); *H01M 10/647* (2015.04); *H01M 10/6555* (2015.04); *H01M 10/6556* (2015.04); *H01M 16/00* (2013.01); *B60L 7/10* (2013.01); *B60L 2240/525* (2013.01); *B60L 2240/526* (2013.01); *B60L 2240/527* (2013.01); *B60L 2240/545* (2013.01); *B60L 2240/547* (2013.01); *B60L 2240/549* (2013.01); *H01M 2010/4271* (2013.01); *H01M 2200/20* (2013.01); *H01M 2220/20* (2013.01); *Y02E 60/10* (2013.01); *Y02T 10/70* (2013.01)

(56) References Cited

U.S. PATENT DOCUMENTS

| | | | |
|---|---|---|---|
| 6,242,887 B1 | 6/2001 | Burke | |
| 6,371,067 B1 | 4/2002 | Schmitz et al. | |
| 6,871,625 B1 | 3/2005 | Burke | |
| 7,319,306 B1 | 1/2008 | Rydman et al. | |
| 2002/0020381 A1 | 2/2002 | Pels | |
| 2005/0058892 A1* | 3/2005 | Ovshinsky | H01M 2/1077 429/120 |
| 2006/0060236 A1 | 3/2006 | Kim | |
| 2007/0033432 A1* | 2/2007 | Pecone | G06F 1/305 714/6.12 |
| 2008/0265586 A1 | 10/2008 | Like et al. | |
| 2008/0276892 A1 | 11/2008 | Doljack | |
| 2009/0000310 A1* | 1/2009 | Bell | B60H 1/00478 62/3.7 |
| 2009/0056661 A1 | 3/2009 | Cook et al. | |
| 2009/0096285 A1 | 4/2009 | Acena et al. | |
| 2009/0141447 A1* | 6/2009 | Soma | B60K 6/445 361/694 |
| 2009/0160249 A1 | 6/2009 | Soma et al. | |
| 2009/0315518 A1 | 12/2009 | Soma et al. | |
| 2011/0074362 A1* | 3/2011 | Midorikawa | H01M 10/443 320/150 |
| 2011/0139397 A1* | 6/2011 | Haussmann | B60H 1/00278 165/43 |
| 2012/0025755 A1* | 2/2012 | Xu | H02J 7/0057 320/103 |
| 2012/0156534 A1 | 6/2012 | Sujan et al. | |
| 2013/0127399 A1 | 5/2013 | Tang et al. | |
| 2013/0154543 A1 | 6/2013 | Richardson et al. | |
| 2013/0213336 A1 | 8/2013 | Solberg et al. | |
| 2013/0264869 A1 | 10/2013 | Klinkig et al. | |
| 2013/0320764 A1 | 12/2013 | Zeller | |
| 2014/0200763 A1 | 7/2014 | Sisk | |
| 2015/0298557 A1 | 10/2015 | Sakata et al. | |
| 2015/0300307 A1 | 10/2015 | Setterberg et al. | |

FOREIGN PATENT DOCUMENTS

| | | | |
|---|---|---|---|
| DE | 29723175 U1 | 4/1998 | |
| DE | 102004062939 A1 | 7/2006 | |
| DE | 102005051433 A1 | 5/2007 | |
| DE | 102007003005 A1 | 2/2008 | |
| DE | 102009006665 A1 | 8/2010 | |
| DE | 102014203030 A1 | 8/2015 | |
| EP | 0945959 A2 | 9/1999 | |
| EP | 2607178 A1 | 6/2013 | |
| EP | 2567424 B1 | 8/2015 | |
| FR | 2923551 A1 | 5/2009 | |
| JP | 2013242979 A | 12/2013 | |
| KR | 101157413 B1 | 6/2012 | |
| WO | WO-9912044 A2 | 3/1999 | |
| WO | WO-0014402 A1 | 3/2000 | |
| WO | WO-2006121005 A1 | 11/2006 | |
| WO | WO-2011097188 A1 | 8/2011 | |
| WO | WO 2011-138156 * | 11/2011 | ............ H01M 10/50 |
| WO | WO-2013027982 A2 | 2/2013 | |

OTHER PUBLICATIONS

Machine translation of WO 2011-138156, Huber et al. (Year: 2011).*

U.S. Appl. No. 15/208,112, filed Jul. 12, 2016, Ciaccio et al.

U.S. Appl. No. 15/434,765, filed Feb. 16, 2017, Ciaccio et al.

International Search Report for Application No. PCT/US2017/020222 dated Jun. 14, 2017.

Kendall, John. 2017 SAE International Article: "PSA's new stop/start system uses ultracaps for energy storage, extra power"; website: <http://articles.sae.org/8412/>; Jun. 21, 2010; 2 Pages.

Warner, Brad. "Valeo i-StARS and ReStart Innovations Offer Affordable Hybrid Solutions for Internal Combustion Engines"; Feb. 27, 2012; website: <http://www.prnewswire.com/news-releases/valeo-i-stars-and-restart-innovations-offer-affordable-hybrid-solutions-for-internal-combustion-engines-140549873.html>; 2 Pages.

Werkstetter, Stefan, "White Paper: Ultracapacitor Usage in Wind Turbine Pitch Control Systems"; Maxwell Technologies, Inc. Jan. 2015; website: http://www.maxwell.com/images/documents/Wind_Turbine_Pitch_Control_White%20Paper_3000722_1.pdf; 10 Pages.

Miller, Gretchen. "Johnson Controls to unveil new battery system for Advanced Start-Stop vehicles at the North American International Auto Show." Johnson Controls; Jan. 8, 2015; website: <http://www.prnewswire.com/news-releases/johnson-controls-to-unveil-new-battery-system-for-advanced-start-stop-vehicles-at-the-north-american-international-auto-show-300017559.html>; 2 Pages.

"In-market Application of Start-Stop Systems in European Market." FEV Inc.; Final Report/Dec. 2011; P26844-01/ A1/ 01/ 61605; website: http://www.theicct.org/sites/default/files/FEV_LDV%20EU%20Technology%20Cost%20Analysis_StartStop%20Overview.pdf; 108 Pages.

Radu, Mihnea. "Hybrid Renault Megane Confirmed for 2017 with dCi Diesel Engine". Sep. 26, 2015; website: https://www.autoevolution.com/news/hybrid-renault-megane-confirmed-for-2017-with-dci-diesel-engine-100384.html; 4 Pages.

(56) References Cited

OTHER PUBLICATIONS

"Brake Energy Regeneration System: i-ELOOP continuously recovers kinetic energy as the vehicle decelerates and reuses it as electricity". MAZDA: Environmental Technology website: http://www.mazda.com/en/innovation/technology/env/i-eloop/; 4 Pages, Printed Jul. 12, 2017.
"BU-205: Types of Lithium-ion". Battery University website: http://batteryuniversity.com/learn/article/types_of_lithium_ion; last updated Jun. 28, 2017; 22 Pages.
Ashley, Steven. 2013 SAE International Article: "Supercapacitors aim to charge ahead"; website: http://articles.sae.org/12554/; Oct. 25, 2013; 2 Pages.
"CAP-XX Introduces Prismatic Supercapacitors for Automotive Stop-Start Applications"; website: http://www.electric-vehiclenews.com/2012/03/cap-xx-introduces-prismatic.html; Mar. 14, 2012; 3 Pages.
"Mazda's i-ELOOP regenerative braking system". Mazda USA; You Tube video: https://www.youtube.com/watch?v=BJHAr4wA2fc; published on Oct. 30, 2012.
PCT—Invitation to Pay Additional Fees and, Where Applicable, Protest Fee dated Jun. 7, 2017 for PCT Application No. PCT/US2017/020236, including Annex to Form PCT/ISA/206: Communication Relating to the Results of the Partial International Search; 15 pages.
Burkert, Andreas. "Power for the Future with 48 V". MTZ Magazine, Jan. 2016, vol. 77; 5 Pages.
International Search Report and Written Opinion dated Aug. 14, 2017 corresponding to International Application No. PCT/US2017/020228, 27 pages.
International Search Report and Written Opinion dated Sep. 19, 2017 corresponding to International Application No. PCT/US2017/020236, 38 pages.
California Environmental Protection Agency Air Resources Board. "Draft Technology Assessment: Medium- and Heavy-Duty Battery Electric Trucks and Buses"; Oct. 2015; 4 pages.
IDTechEx. "A very different supercapacitor bus". Web site: http://www.electricvehiclesresearch.com/articles/6974/a-very-different-supercapacitor-bus; printed May 9, 2016; 2 pages.
Dr. A. Schneuwly, Dipl. Ing. J. Auer, Dr. J. Miller. Maxwell Technologies SA. White Paper: "Ultracapacitors Help to Overcome the Prospective Energy Requirements of Vehicles". Apr. 2009; 21 pages.

\* cited by examiner

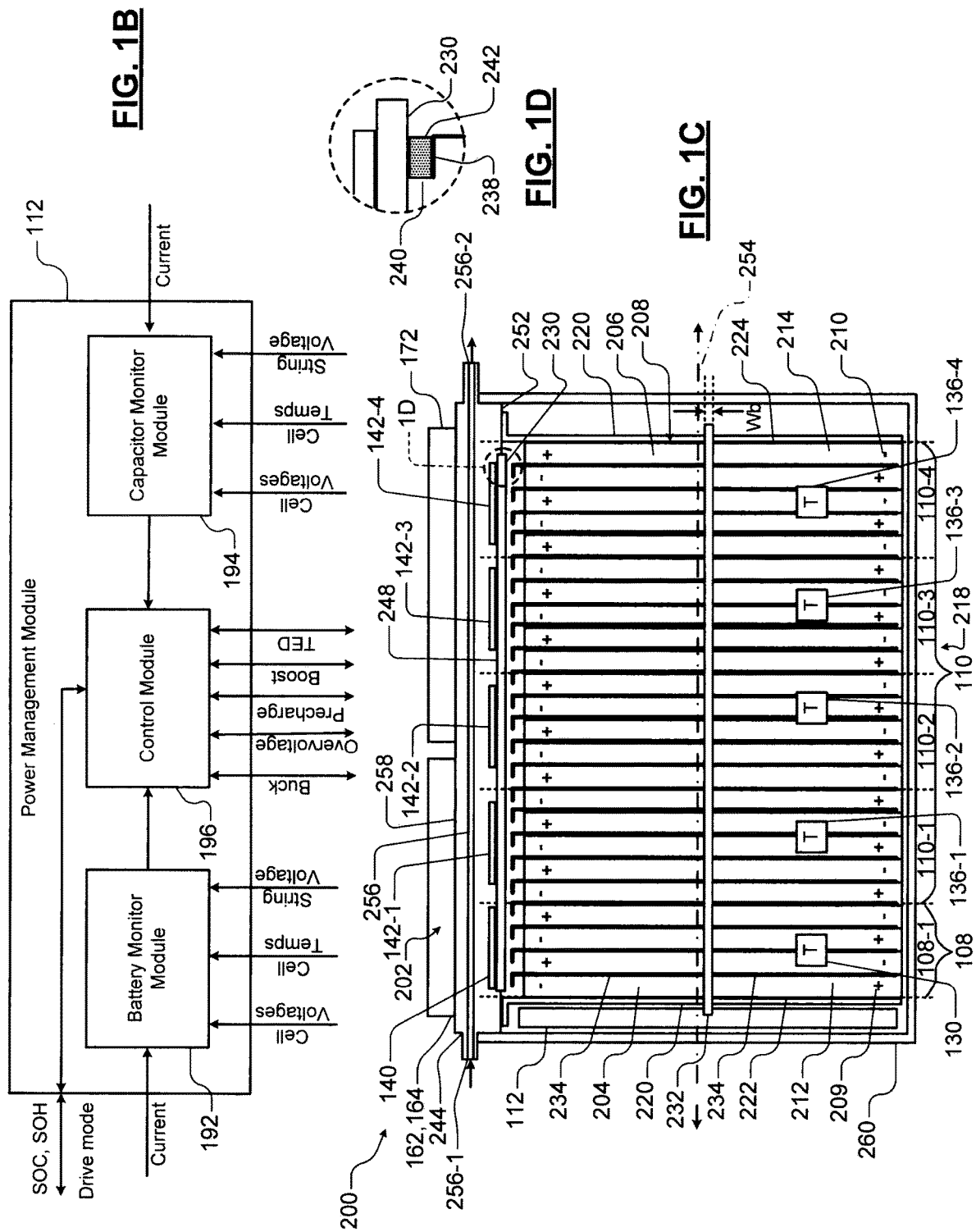

BATTERY AND CAPACITOR ASSEMBLY FOR A VEHICLE AND A METHOD FOR HEATING AND COOLING THE BATTERY AND CAPACITOR ASSEMBLY

CROSS-REFERENCE TO RELATED APPLICATIONS

This application claims the benefit of U.S. Provisional Application No. 62/302,386, filed on Mar. 2, 2016. The entire disclosure of this application is incorporated herein by reference.

CROSS-REFERENCE TO RELATED APPLICATIONS

This application is related to U.S. Provisional Application No. 62/302,372, filed on Mar. 2, 2016, and U.S. application Ser. No. 15/208,112, filed on Jul. 12, 2016, and U.S. application Ser. No. 15/434,765, filed on Feb. 16, 2017. The entire disclosure of each of the above applications is incorporated herein by reference.

FIELD

The present disclosure relates to vehicle battery systems, and more particularly to battery and capacitor assemblies for a vehicle and methods for heating and cooling the battery and capacitor assemblies.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles typically use a powertrain system including an engine, a stop-start or mild hybrid system including a starter/generator and/or one or more electric motors for propelling the vehicle. During operation, current needs to be supplied to start the engine, to supply loads connected to a vehicle power bus, to restart the engine, to drive the electric motors or starter/generator to move the vehicle and/or to recharge the batteries. For example in some mild hybrids, the electric motors or starter/generator drives the vehicle for brief periods such as 1-2 seconds during restarts to eliminate engine hesitation as the engine cranks, starts and reaches idle or other engine speed (hereinafter referred to as e-boost). As a result, significant engineering effort has been invested to improve the battery systems of hybrid vehicles to meet the increasing current loads.

The automotive industry has also proposed using batteries operating at higher voltage levels such as 24V, 36V and 48V and/or systems incorporating supercapacitors or ultracapacitors. However, these systems are fairly complex since they still need to operate with legacy 12V vehicle systems and components.

Some vehicle battery systems include a 12V battery (having a high capacity such as 100 Ah) in addition to a higher voltage battery, a supercapacitor or an ultracapacitor.

SUMMARY

In one example, the present disclosure describes a battery and capacitor assembly for a hybrid vehicle that includes a plurality of battery cells, a plurality of capacitor cells, a cooling plate, a pair of end brackets, and a housing. The plurality of capacitor cells are arranged adjacent to the plurality of battery cells such that the plurality of battery cells and the plurality of capacitor cells form a cell stack. The pair of end brackets are disposed at opposite ends of the cell stack and are attached to the cooling plate. The pair of end brackets compress the plurality of battery cells and the plurality of capacitor cells. The housing is attached to the cooling plate and encloses the cell stack and the pair of end brackets.

In one aspect, each of the plurality of battery cells and each of the plurality of capacitor cells has a pouch cell configuration. In another aspect, each of the plurality of battery cells is a lithium ion cell, and each of the capacitor cells is a supercapacitor cell and/or an ultracapacitor cell.

In other aspects, the battery and capacitor assembly further includes a pair of side brackets disposed on opposite sides of the cell stack and extending between the opposite ends of the cell stack. The side brackets are attached to the end brackets and cooperate with the end brackets to compress the plurality of battery cells and the plurality of capacitor cells.

In other aspects, the battery and capacitor assembly has a length extending between exterior end surfaces of the housing adjacent to the opposite ends of the cell stack, a width that extends between exterior side surfaces of the housing, and a height that extends between an exterior bottom surface of the housing and an exterior top surface of the cooling plate.

In one aspect, the width and/or length is less than or equal to 260 millimeters. In another aspect, the width is less than or equal to 200 millimeters and the height is less than or equal to 260 millimeters. In another aspect, the length is less than or equal to 400 millimeters.

In another aspect, the cooling plate defines a coolant channel for passing coolant through the cooling plate that absorbs heat from the cooling plate.

In another aspect, the battery and capacitor assembly further includes a plurality of heatsink plates disposed between adjacent ones of the plurality of battery cells and the plurality of capacitor cells and arranged to transfer heat to and from the cooling plate through conduction.

In another aspect, the battery and capacitor assembly further includes a plurality of thermoelectric devices disposed between the cooling plate and the cell stack and configured to adjust a temperature of the plurality of battery cells and adjust a temperature of the plurality of battery cells independent of adjusting the temperature of the plurality of battery cells.

In another aspect, at least one of the plurality of thermoelectric devices is disposed between the cooling plate and the plurality of battery cells, and at least one of the plurality of thermoelectric devices is disposed between the cooling plate and the plurality of capacitor cells.

In another aspect, the battery and capacitor assembly further includes a temperature distribution plate disposed between the plurality of thermoelectric devices and the cell stack and in contact with the cooling plate and/or the plurality of thermoelectric devices. The plurality of thermoelectric devices are in contact with the cooling plate.

In another aspect, each of the plurality of heatsink plates includes a plate-like body and a flange. The plate-like body is disposed between adjacent ones of the plurality of battery cells and the plurality of capacitor cells. The flange transfers heat to and from the temperature distribution plate through conduction using direct contact with the temperature distribution plate and/or a filler material disposed between the flange and the temperature distribution plate.

In another example, the present disclosure describes a battery and capacitor assembly for a hybrid vehicle that includes a plurality of battery cells, a plurality of capacitor cells, a cooling plate, and a plurality of thermoelectric devices. The plurality of capacitor cells are arranged adjacent to the plurality of battery cells such that the plurality of battery cells and the plurality of capacitor cells form a cell stack. The plurality of thermoelectric devices are disposed between the cooling plate and the cell stack. In addition, the plurality of thermoelectric devices are configured to heat and cool the plurality of battery cells and heat and cool the plurality of capacitor cells independent of heating and cooling the plurality of battery cells.

In one aspect, at least one of the plurality of thermoelectric devices is arranged to heat and cool the plurality of capacitor cells, and at least one of the plurality of thermoelectric devices is arranged to heat and cool the plurality of battery cells.

In another aspect, a single one of the plurality of thermoelectric devices is arranged to heat and cool the plurality of capacitor cells, and at least two of the plurality of thermoelectric devices are arranged to heat and cool the plurality of battery cells.

In another aspect, each of the plurality of thermoelectric devices is aligned with one of the plurality of battery cells and the plurality of capacitor cells which the thermoelectric device is configured to heat and cool.

In another aspect, the battery and capacitor assembly further includes a temperature distribution plate disposed between the plurality of thermoelectric devices and the cell stack and in contact with the cooling plate and/or the plurality of thermoelectric devices. The plurality of thermoelectric devices are in contact with the cooling plate.

In another aspect, the plurality of thermoelectric devices are disposed within pockets in the cooling plate, and the temperature distribution plate captures the plurality of thermoelectric devices within the pockets. In another aspect, the temperature distribution plate is partially inset in the cooling plate.

In another aspect, the battery and capacitor assembly further includes a plurality of heatsink plates disposed between adjacent ones of the plurality of battery cells and the plurality of capacitor cells. The plurality of heatsink plates are arranged to transfer heat to and from the temperature distribution plate through conduction.

In other aspects, each of the plurality of heatsink plates includes a plate-like body and a flange. The plate-like body is disposed between adjacent ones of the plurality of battery cells and the plurality of capacitor cells. The flange transfers heat to and from the temperature distribution plate through conduction using direct contact with the temperature distribution plate and/or a filler material disposed between the flange and the temperature distribution plate.

In another example, the present disclosure describes a system for controlling temperatures of a plurality of battery cells and a plurality of capacitor cells disposed within a common enclosure. The system includes a battery temperature sensor, a capacitor temperature sensor, and a control module. The battery temperature sensor measures the temperature of the plurality of battery cells. The capacitor temperature sensor measures the temperature of the plurality of capacitor cells. The control module controls an amount of current, voltage, and/or power supplied to a plurality of thermoelectric devices to heat and cool the plurality of battery cells based on the battery cell temperature. In addition, the control module controls the amount of current, voltage, and/or power supplied to the plurality of thermoelectric devices to heat and cool the plurality of capacitor cells based on the capacitor cell temperature and independent of heating and cooling the plurality of capacitor cells.

In one aspect, the control module controls the amount of current, voltage, and/or power supplied to a first one of the plurality of thermoelectric devices to one of heat and cool the plurality of battery cells, and controls the amount of current, voltage, and/or power supplied to a second one of the plurality of thermoelectric devices to one of heat and cool the plurality of battery cells.

In another aspect, the control module heats the plurality of battery cells when the battery cell temperature is less than a first temperature, cools the plurality of battery cells when the battery cell temperature is greater than a second temperature. In another aspect, the control module heats the plurality of capacitor cells when the capacitor cell temperature is less than a third temperature, and cools the plurality of capacitor cells when the capacitor cell temperature is greater than a fourth temperature.

In another aspect, the third temperature is different than the first temperature, and the fourth temperature is different than the second temperature. In another aspect, the third temperature is less than the first temperature, and the fourth temperature is less than the second temperature. In another aspect, each of the first, second, third, and fourth temperatures is predetermined.

In another aspect, the control module determines the first temperature based on a target resistance of the plurality of battery cells, a target amount of power supplied by the plurality of battery cells, and/or a target capacity of the plurality of battery cells. In another aspect, the control module determines the third temperature based on a target resistance of the plurality of capacitor cells, a target amount of power supplied by the plurality of capacitor cells, and/or a target capacity of the plurality of capacitor cells.

In another aspect, the control module heats the plurality of battery cells when the battery cell temperature is less than a first temperature if the plurality of battery cells are charging, and the control module does not heat the plurality of battery cells when the battery cell temperature is less than the first temperature if the plurality of battery cells are discharging.

In another example, the present disclosure describes a method for controlling temperatures of a plurality of battery cells and a plurality of capacitor cells disposed within a common enclosure. The method includes measuring the temperature of the plurality of battery cells, measuring the temperature of the plurality of capacitor cells, and controlling an amount of current, voltage, and/or power supplied to a plurality of thermoelectric devices to heat and cool the plurality of battery cells based on the battery cell temperature. The method further includes controlling the amount of current, voltage, and/or power supplied to the plurality of thermoelectric devices to heat and cool the plurality of capacitor cells based on the capacitor cell temperature and independent of heating and cooling the plurality of capacitor cells.

In another aspect, the method further includes controlling the amount of current, voltage, and/or power supplied to a first one of the plurality of thermoelectric devices to one of heat and cool the plurality of battery cells, and controlling the amount of current, voltage, and power supplied to a second one of the plurality of thermoelectric devices to one of heat and cool the plurality of battery cells.

In another aspect, the method further includes heating the plurality of battery cells when the battery cell temperature is less than a first temperature, and cooling the plurality of battery cells when the battery cell temperature is greater than a second temperature. In another aspect, the method further includes heating the plurality of capacitor cells when the capacitor cell temperature is less than a third temperature, and cooling the plurality of capacitor cells when the capacitor cell temperature is greater than a fourth temperature.

In another aspect, the third temperature is different than the first temperature, and the fourth temperature is different than the second temperature. In another aspect, the third temperature is less than the first temperature, and the fourth temperature is less than the second temperature. In another aspect, each of the first, second, third, and fourth temperatures is predetermined.

In another aspect, the method further includes determining the first temperature based on a target resistance of the plurality of battery cells, a target amount of power supplied by the plurality of battery cells, and/or a target capacity of the plurality of battery cells. In another aspect, the method further includes determining the third temperature based on a target resistance of the plurality of capacitor cells, a target amount of power supplied by the plurality of capacitor cells, and/or a target capacity of the plurality of capacitor cells.

In another aspect, the method further includes heating the plurality of battery cells when the battery cell temperature is less than a first temperature if the plurality of battery cells are charging, and not heating the plurality of battery cells when the battery cell temperature is less than the first temperature if the plurality of battery cells are discharging.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1B is a more detailed functional block diagram of an example of a power management module in FIG. 1A;

FIG. 1C is a cross-sectional view of an integrated battery and capacitor assembly with heating and cooling capability according to the present disclosure;

FIG. 1D is a cross-sectional view of a portion of the integrated battery and capacitor assembly of FIG. 1C within a circle 1D shown in FIG. 1C;

In the drawings, reference numbers may be reused to identify similar and/or identical elements.

DETAILED DESCRIPTION

Figure 1A:
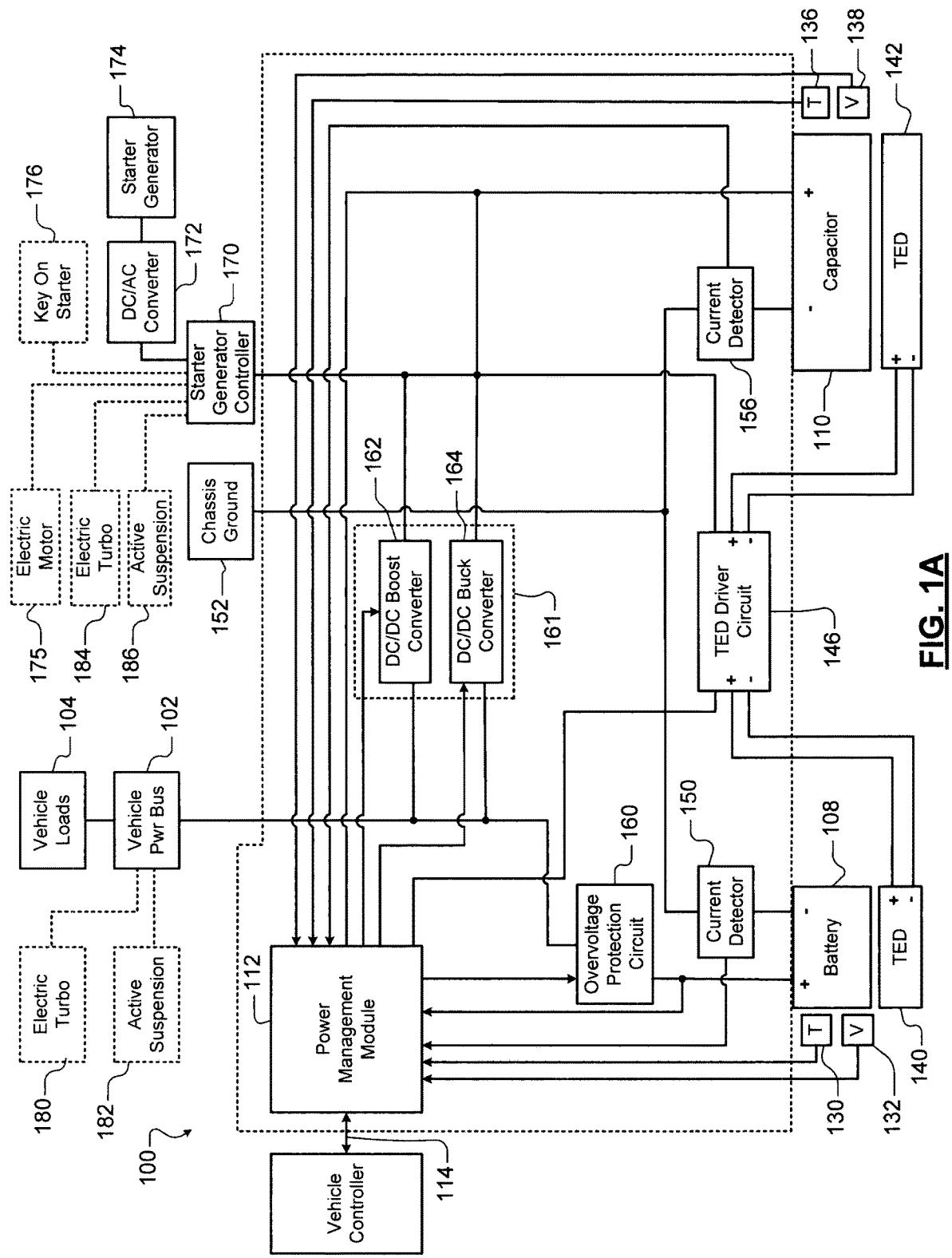
FIG. 1A is a functional block diagram of an example of a power management system for supplying power from and recharging of a battery and a capacitor according to the present disclosure.

In systems and methods for supplying power in a hybrid vehicle according to the present disclosure, higher current loads that occur during starting or e-boost events are predominantly supplied by a capacitor such as a supercapacitor or an ultracapacitor. Current is also supplied by a battery at a limited and controlled rate during these events. As a result, the capacity and physical size of the battery can be substantially reduced while keeping the discharge rate (or C-rate) of the battery to a reasonable level.

In conventional battery systems, cranking after a "key-on" event is solely supported by the battery. As a result, the battery needs to have a sufficient capacity and discharge rate. The discharge rate or C-rating is defined as a ratio of current/capacity. For example, a first battery can supply 850 A and has a capacity of 100 Ah (C-rate of 850 A/100 Ah=8.5). In contrast, a second battery can supply 850 A and has a capacity of 17 Ah (C-rate of 850 A/17 Ah=50). While both batteries supply the same amount of current, the second battery will have a significantly shorter battery life than the first battery in similar applications. In other words, the C-rate of the battery directly affects battery life and higher C-rates correspond to shorter battery life.

Unlike other hybrid battery topologies, the battery used in the power management system according to the present disclosure does not independently support key-on engine starting. The main function of the battery is to directly support vehicle loads such as boardnet loads. The battery also supplies controlled and limited current flow to indirectly support key-on engine starts and hybrid drive cycle events such as engine re-starting and/or electric boost. The battery is also used to recharge the capacitor after cranking.

Power supplied during regenerative/engine braking is used to recharge the capacitor rather than the battery. Power from the capacitor is fed to the battery at a limited and controlled rate over time, which reduces battery peak charge loads. In the systems and methods described herein, battery requirements are driven by energy rather than voltage drop at cranking amps, which allows a smaller capacity battery to be used.

The present disclosure can also be configured to support pulse-type vehicle loads, such as electric turbo systems or electric active suspension systems, by selectively supplying current from the capacitor via an AC/DC converter and/or a starter generator controller. Having the capacitor supply the pulse-type vehicle loads improves battery life and minimizes the requirements, size and cost of the battery.

The specifications of the battery can be varied based on the severity of the hybrid drive cycle and pulse-type boardnet loads that are expected for a given application. In general, the battery requirements, size and cost will be lower than hybrid topologies where the battery directly or substantially contributes to the hybrid drive cycle.

The packaging cost of the battery and wiring are greatly reduced though integration of the battery into an integrated battery and capacitor assembly. Additional packaging details of the integrated battery and capacitor assembly can be found in U.S. Application No. 62/302,372, filed on Mar. 2, 2016, which is incorporated by reference in its entirety.

Referring now to FIG. 1A, a power management system 100 for controlling the supply of power from and recharging of a battery 108 and a capacitor 110 is shown. In some examples, the battery includes a 12 V battery including multiple battery cells connected in series and/or parallel to positive and negative battery terminals. In some examples, the battery cells are made using lithium iron phosphate (LiFePO$_4$) chemistry. In other examples, the battery cells are made using lithium titanate (Li$_4$Ti$_5$O$_{12}$) (LTO) chemistry, other lithium ion chemistry, or other battery chemistry. In some examples, the battery 108 includes pouch cells arranged in a 4sNp configuration. In some examples, the battery 108 provides 12.8 V nominal (8.0V to 14.4 V) and has a capacity of 20 Ah/256 Wh. In other examples, the battery has a capacity less than or equal to 20 Ah and a C-rate less than or equal to 6.

In some examples, the capacitor 110 includes multiple capacitor cells connected in series and/or parallel to positive and negative capacitor terminals. In some examples, the capacitor 110 includes supercapacitors or ultracapacitors. In some examples, the capacitor 110 provides 12V, 24V, 36V, or 48V nominal (0-54 V). In some examples, a pouch cell format is used for capacitor cells in the capacitor. In some examples, the capacitors are connected in an 18sNp configuration and have a capacity of 0.6 Ah (30 Wh).

A power management module 112 controls the supply of power from and recharging of the battery 108 and the capacitor 110. The power management module 112 may communicate over a vehicle data bus 114 with other vehicle controllers and/or with components of the power management system 100. The power management module 112 may transmit data such as state of charge (SOC) and state of health (SOH) for the battery 108 and the capacitor 110 to other vehicle controllers. In some examples, the vehicle data bus 114 includes a CAN bus, although other data bus types can be used. In some examples, the power management module 112 receives information such as key-on events, vehicle speed, drive mode events, engine oil temperature, regeneration events, e-boost events or other control information from other vehicle controllers. Vehicle speed may be indicative of a future regeneration event. Engine oil temperature may be indicative of engine load during cranking. The power management module 112 may adjust operation of the power management system 100 based on these signals.

In some operating modes, the power management module also controls the supply of current to a vehicle power bus 102 and vehicle loads 104 such as boardnet loads. The power management module 112 receives battery operating parameters from one or more sensors such as temperature sensors 130 and/or voltage sensors 132. In some examples, the temperature sensors 130 and the voltage sensors 132 monitor temperatures and voltages at the battery cell level. The power management module 112 also receives capacitor operating parameters from one or more sensors such as temperature sensors 136 and/or voltage sensors 138. In some examples, the temperature sensors 136 and the voltage sensors 138 monitor temperatures and voltages at the capacitor cell level.

Temperature control of the battery 108 and/or the capacitor 110 may be provided by thermoelectric devices (TEDs) 140 and 142, respectively. A TED driver circuit 146 controls the TEDs 140 and 142. The power management module 112 selectively actuates the TED driver circuit 146 as needed to adjust the amount of current, voltage, and/or power supplied to the TEDs 140 and 142 and thereby control the temperature of the battery 108 and the capacitor 110. In some examples, the TEDs 140 and/or 142 include one or more heating/cooling zones that allow individual and independent temperature control of one or more battery cells or capacitor cells.

In some cases, when controlling the TEDs 140 and 142 to cool the battery 108 and/or the capacitor 110, increasing the amount of current, voltage, and/or power supplied to the TEDs 140 and 142 may increase the amount of cooling provided by the TEDs 140 and 142. However, increasing the amount of current, voltage, and/or power supplied to the TEDs 140 and 142 may also increase the amount of resistive heat provided by the TEDs 140 and 142. Thus, in some cases, increasing the amount of current, voltage, and/or power supplied to the TEDs 140 and 142 may decrease the overall cooling effect of the TEDs 140 and 142. Therefore, the amount of current, voltage, and/or power supplied to the TEDs 140 and 142 may be controlled based on a balance between the amount of cooling provided by the TEDs 140 and 142 and the amount of resistive heat provided by the TEDs 140 and 142.

The power management module 112 may control the amount of current, voltage, and/or power supplied to the TEDs 140 and 142 based on the aforementioned balance to achieve a maximum temperature difference across the TEDs 140 and 142. The temperature difference across each of the TEDs 140 and 142 is an indicator of their respective overall cooling effects. In some examples, the power management module 112 controls the TEDs 140 and 142 in an open-loop manner based on a predetermined relationship between (1) the amount of current, voltage, and/or power supplied to the TEDs 140 and 142 and (2) the temperature difference across the TEDs 140 and 142. In some conditions, the power management module 112 adjusts or selects the predetermined relationship based on the age and/or temperature of the battery 108 and/or the capacitor 110.

In some examples, the power management module 112 controls the amount of current, voltage, and/or power supplied to the TEDs 140 and 142 in a closed-loop manner based on a measured temperature difference across the TEDs 140 and 142. For example, the power management module 112 may adjust the amount of current, voltage, and/or power supplied to the TEDs 140 and 142 to maximize their measured temperature differences and thereby maximize their cooling effects.

In contrast, when controlling the TEDs 140 and 142 to heat the battery 108 and/or the capacitor 110, resistive heating adds to, rather than detracts from, the overall heating effect of the TEDs 140 and 142. Thus, in some examples, the power management module 112 always increases the amount of current, voltage, and/or power supplied to the TEDs 140 and 142 to increase the amount of heat provided by the TEDs 140 and 142.

A current detector circuit 150 detects current supplied by the battery or supplied to the battery during recharging. The current detector circuit 150 may be arranged between a negative terminal of the battery 108 and chassis ground 152. A current detector circuit 156 detects current supplied by the capacitor 110 or supplied to the capacitor 110 during recharging. The current detector circuit 156 may be arranged between a negative terminal of the capacitor 110 and the chassis ground 152. The current detector circuits 150 and 156 provide sensed battery current and capacitive current values, respectively, to the power management module 112.

An overvoltage protection circuit 160 may be arranged between a positive terminal of the battery 108 and loads such as the vehicle power bus 102. The overvoltage protection circuit 160 monitors a voltage output of the battery and provides a voltage value to the power management module 112. The overvoltage circuit 160 protects the battery from overcharging when one or more cells is at or above a voltage limit of the battery cell. Another function of the overvoltage circuit 160 is to protect the battery from excessive current. If an over voltage condition is detected, the battery 108 may be disconnected or other actions may be taken. For example, excessive voltage or current may occur during charging with an external charger.

In some examples, the power management module 112 performs battery management including cell voltage measurement, cell balancing, temperature measurement, current limits calculations, state of charge (SOC) estimation and/or state of health (SOH) estimation based on the measured battery parameters. In some examples, the power management module 112 also performs capacitor management including cell voltage measurement, cell balancing, temperature measurement, current limits calculations, SOC estimation and/or SOH estimation based on measured capacitor parameters.

A DC/DC converter 161 may be provided to control flow of the current between the battery 108, the capacitor 110 and/or a starter/generator 174. In some examples, the DC/DC converter 161 includes a DC/DC boost converter 162 and a DC/DC buck converter 164 that are connected between the battery 108, the capacitor 110 and the starter/generator 174. In some examples, the DC/DC boost converter 162 has an input range of 8V to 16V and a current input range of 0-100 Amps. In some examples, the DC/DC boost converter 162 has an output range of 24V to 54V and a current output range of 0-67 Amps.

In some examples, the DC/DC buck converter 164 has an input range of 24V to 54V and a current input range of 0-53 Amps. In some examples, the DC/DC buck converter 164 has an output range of 8V to 16V and a current output range of 0-80 Amps. As can be appreciated, the ratings of the DC/DC boost converter 162 and the DC/DC buck converter 164 will vary for different applications.

A starter/generator controller 170 is connected to the DC/DC boost converter 162, the DC/DC buck converter 164, and the capacitor 110. The starter/generator controller 170 is also connected to a DC/AC converter 172, which is connected to the starter/generator 174. The starter/generator 174 is connected to an engine (not shown). In some examples, one or more electric motors 175 for driving the wheels may be provided.

The vehicle power bus 102 may also be connected to an electric turbo 180 and/or an active suspension system 182, which operate at the voltage of the battery 108. Alternately, an electric turbo 184 and/or an active suspension system 186 may be connected to the starter/generator controller 170 and/or the DC/AC converter 172 if they operate at higher voltages such as 24V, 36V, 48V, etc.

In some examples, a key-on starter 176 may be connected to the starter/generator controller 170 and may be provided for starting larger displacement engines requiring higher starting current. The key-on starter 176 may be supplied by current from the capacitor 110 and assisted in a limited and controlled manner by current supplied by the battery 108 as described above.

Referring now to FIG. 1B, an example of the power management module 112 is shown in further detail. The power management module 112 includes a battery monitoring module 192, a capacitor monitoring module 194 and a control module 196. The battery monitoring module 192 receives cell voltages, battery current, cell temperatures and/or string voltage as described above in FIG. 1A. The battery monitoring module 192 performs cell balancing, calculates state of charge (SOC) and/or state of health (SOH) values for the battery 108. The capacitor monitoring module 194 also receives cell voltages, capacitor current, cell temperatures and/or string voltage as described above in FIG. 1A. The capacitor monitoring module performs cell balancing, calculates SOC and/or calculates SOH for the capacitor 110.

The control module 196 communicates with the battery monitoring module 192 and the capacitor monitoring module 194. The control module 196 may also receive information such as key-on events, vehicle speed, engine oil temperature, drive mode events, regeneration events, e-boost events or other control information from other vehicle controllers via the vehicle data bus 114. The control module 196 may also share SOC and SOH values for the battery 108 and the capacitor 110 with other vehicle controllers via the vehicle data bus 114.

The control module 196 enables and disables the DC/DC converter 161. For example, the control module enables and disables the DC/DC buck converter 164 and the DC/DC boost converter 162 as needed during the various drive or operating modes. The control module 196 also monitors operation of the overvoltage protection circuit 160. The control module 196 also communicates with the TED driver circuit 146 to control heating/cooling of zones in the TEDs 140 and 142 associated with the battery 108 and the capacitor 110.

Figure 1E:
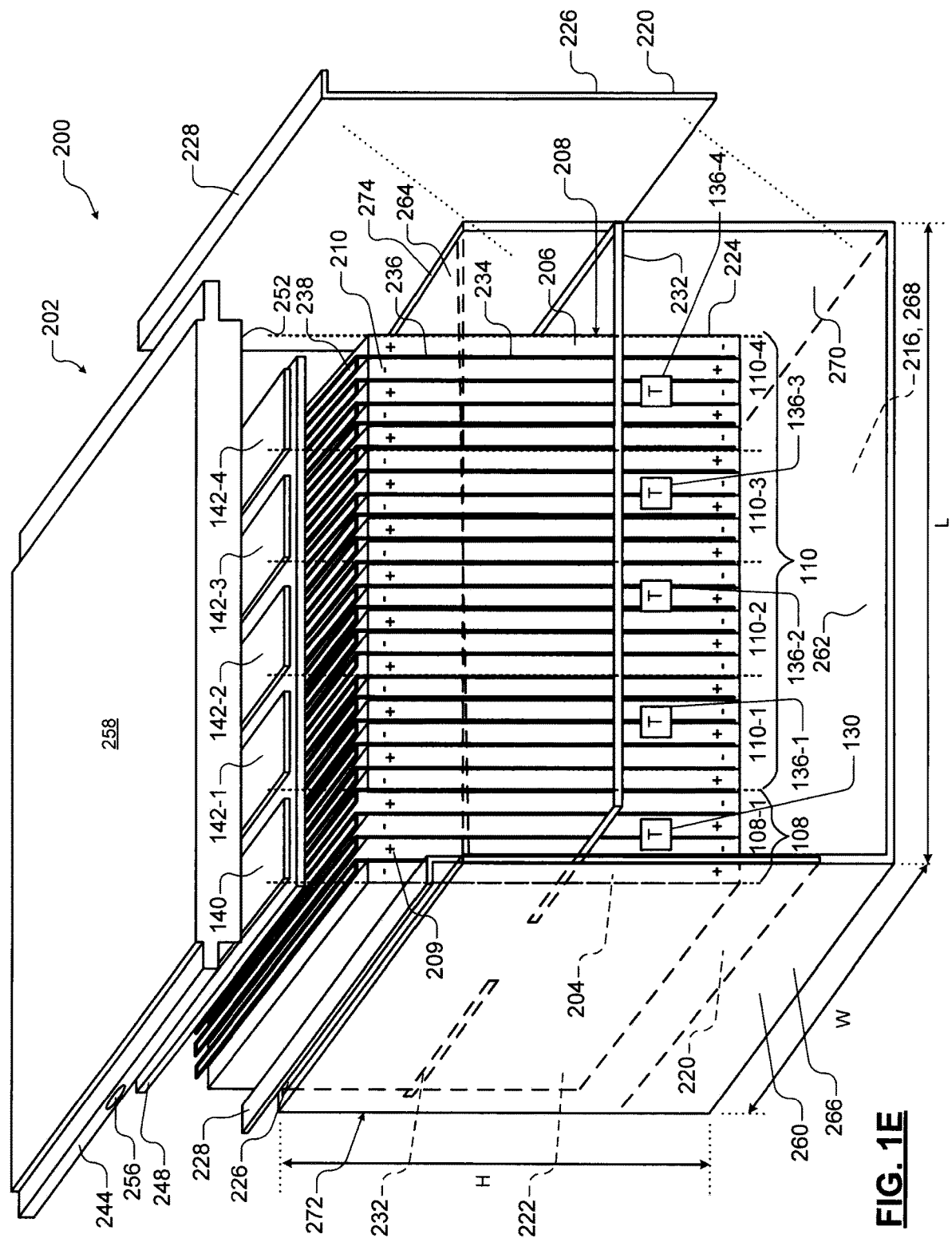
FIG. 1E is a partially exploded perspective view of the integrated battery and capacitor assembly of FIG. 1C.

Referring now to FIGS. 1C and 1E, an example of a battery and capacitor assembly 200 is shown. The battery and capacitor assembly 200 includes the battery 108, the capacitor 110, and a cooling plate assembly 202. The battery 108 and the capacitor 110 include cells 204 and 206, respectively, that are arranged adjacent one another so as to form a cell stack 208. Each of the cells 204 and/or 206 may be pouch-type cells.

The cells 204 and 206 have terminals or tabs 209 and 210, respectively, for conducting current to and from the cells 204 and 206. The tabs 209 and 210 extend from top surfaces 212 and 214, respectively, of the cells 204 and 206. In FIGS. 1C and 1E, the cells 204 and 206 are arranged with their side surfaces facing downward such that the tabs 209 and 210 extend toward a side 216 of the battery and capacitor assembly 200 shown in FIG. 1E. Alternatively, the cells 204 and 206 may be arranged with their bottom surfaces facing upward such that the tabs 209 and 210 extend toward a bottom end 218 of the battery and capacitor assembly 200 shown in FIG. 1C.

End brackets 220 are positioned at opposite ends 222 and 224 of the cell stack 208, alongside outwardly-facing surfaces of outer ones of the cells 204 and 206, such that the cells 204 and 206 are arranged between the end brackets 220. In some examples, the end brackets 220 have a generally "L"-shaped cross section as shown in FIG. 1C. In some examples, the end brackets 220 are made from metal (e.g., sheet metal). As shown in FIG. 1E, each of the end brackets 220 may include a plate-like body 226 and a flange 228 extending from an end of the plate-like body 226 at an angle (e.g., 90 degrees) relative to the plate-like body 226. The end brackets 220 are attached to the cooling plate assembly 202 by, for example, inserting a fastener through the flanges 228 of the end brackets 220 and into the cooling plate assembly 202. The end brackets 220 provide a compressive force on the pouch-type capacitive and battery cells located therebetween during operation. In addition, the end brackets 220 secure the cell stack 208 to the cooling plate assembly 202.

Side brackets 232 are positioned on opposite sides of the cell stack 208 and extend between the ends 222 and 224 of the cell stack 208. In some examples, two side brackets may be position on each side of the cell stack 208, yielding a total of four side brackets. In some examples, the side brackets 232 have a generally "C"-shaped cross section as shown in FIG. 1E. In some examples, each of the side brackets 232 has a width Wb (FIG. 1C) in a range from 0.25 inches to 0.75 inches (e.g., 0.5 inches). In some examples, the side brackets 232 are made from metal (e.g., sheet metal). During assembly, the end brackets 220 may be positioned at the ends 222 and 224 of the cell stack 208 and attached to the cooling plate assembly 202. The end brackets 220 may be held in a position to apply a compressive force to the cell stack 208 using a compression fixture. The side brackets 232 may then be fit over and attached to the end brackets 220, and the compression fixture may be removed. Thus, the side brackets 232 may cooperate with the end brackets 220 to compress the cells 204 and 206 in the cell stack 208.

Heatsink plates 234 are arranged between the cells 204 and 206 to dissipate heat. In some examples, the heatsink plates 234 have a generally "L"-shaped cross section as shown in FIG. 1C. In some examples, the heatsink plates 234 are made from metal (e.g., aluminum). As shown in FIG. 1E, each of the heat sink plates 234 may include a plate-like body 236 and a flange 238 extending from the plate-like body 236 at an angle (e.g., 90 degrees) relative to the plate-like body 236.

The flanges 238 of the heatsink plates 234 are in thermal contact with an outer bottom surface 230 of a temperature distribution plate 248 of the cooling plate assembly 202 so as to transfer heat to and from the temperature distribution plate 248 through conduction. For example, the flanges 238 of the heatsink plates 234 may directly contact the bottom surface 230. Alternatively, with brief reference to FIG. 1D, there may be a gap 240 between the flanges 238 and the bottom surface 230 to allow vertical movement of the heatsink plates 234, and a filler material 242 may be disposed in the gap 240. The filler material 242 may include grease, epoxy, foam, and/or another suitable type of material for transferring heat between the heat sink plates 234 and the cooling plate assembly 202 via conduction.

Referring again to FIGS. 1C and 1E, the cooling plate assembly 202 includes a cooling plate 244, the TEDs 140 and 142, and the temperature distribution plate 248. In some examples, the cooling plate 244 is formed (e.g., cast or machined) from metal (e.g., aluminum). In some examples, the TEDs 140 and 142 are embedded in the cooling plate 244, and the temperature distribution plate 248 captures the TEDs 140 and 142 within the cooling plate 244. In some examples, the cooling plate 244 defines pockets or raised mounting areas, the TEDs 140 and 142 are positioned within the pockets or on the raised mounting areas, and the temperature distribution plate 248 is attached to the cooling plate 244 to capture the TEDs 140 and 142 within the pockets or raised mounting areas. In addition, the temperature distribution plate 248 may be partially inset in the cooling plate 244 and project from a bottom surface 252 thereof as shown in FIG. 1C. Alternatively, the temperature distribution plate 248 may be completely proud of the cooling plate 244 on a raised mounting area on the cooling plate 244.

The temperature distribution plate 248 dissipates or spreads out hot or cold spots along surfaces thereof to equalize temperature variation. In some examples, the temperature distribution plate 248 may also be split into zones with thermal separation therebetween so that the battery 108 and the capacitor 110 may be maintained at different temperatures. For example, the temperature distribution plate 248 may include a first plate positioned adjacent to the cells 204 of the battery 108, and a second plate positioned adjacent to the cells 206 of the capacitor 110 and thermally insulated from the first plate. In some examples, the temperature distribution plate 248 is formed (e.g., stamped) from metal (e.g., aluminum).

The TEDs 140 and 142 are arranged in one or more heating/cooling zones to independently control the temperatures of the zones and/or of cells disposed therein. The zones may be thermally insulated from one another using, for example, an air gap disposed between the zones. In the example shown, the TED(s) 140 consists of a single TED arranged in a zone 108-1 of the battery 108, and the TED(s) 142 includes TEDs 142-1, 142-2, 142-3, and 142-4 arranged in zones 110-1, 110-2, 110-3, and 110-4, respectively, of the capacitor 110. The TED(s) 140 is arranged to control the temperature(s) of the cells 204 of the battery 108 and/or the zone(s) in which the cells 204 are disposed. For example, the TED(s) 140 may be disposed above the cells 204, adjacent to the cells 204, and/or aligned with the cells 204 along a longitudinal axis 254 of the battery and capacitor assembly 200 shown in FIG. 1C.

The TEDs 142-1 through 142-4 are arranged to control the temperature(s) of cells 206 of the capacitor 110 and/or the zone(s) in which the cells 204 are disposed. For example, the TEDs 142-1 through 142-4 may be disposed above the cells 206, adjacent to the cells 206, and/or aligned with the cells 206 along the longitudinal axis 254. Thus, the TEDs 140 and 142 may be used to independently control the temperatures of the cells 204 and 206, respectively. In some examples, multiple TEDs may be used in place of the TED(s) 140 to control the temperature(s) of the cells 204 of the battery 108. In some examples, a single TED may be used in place of the TEDs 142-1 through 142-4 to control the temperature(s) of the cells 206 of the capacitor 110.

The temperatures sensors 130 are arranged adjacent to the battery cells 204 to measure the temperature thereof. For example, the temperature sensors 130 may be positioned between the top surfaces 212 of the battery cells 204 and an interior surface of the side 216 of the battery and capacitor assembly 200 as shown in FIG. 1E. In other examples, the temperature sensors 130 may be positioned in or on the TED(s) 140, or on a busbar (not shown) that connects the tabs 209 of the battery cells 204 to each other. In some examples, the temperature sensors 130 may include a temperature sensor for each of the battery cells 204. In some examples, a single temperature sensor may be used to measure the temperature of all of the battery cells 204.

The temperatures sensors 136 are arranged adjacent to the capacitor cells 206 to measure the temperature thereof. For example, the temperature sensors 136 may be positioned between the top surfaces 214 of the capacitor cells 206 and the interior surface of the side 216 of the battery and capacitor assembly 200 as shown in FIG. 1E. In other examples, the temperature sensors 130 may be positioned in or on one or more (e.g., all) of the TEDs 142-1 through 142-4, or on a busbar (not shown) that connects the tabs 210 of the capacitor cells 206 to each other. In some examples, the temperature sensors 136 may include a temperature sensor for each of the capacitor cells 206. In some examples, a single temperature sensor may be used to measure the temperature of all of the capacitor cells 206.

In some examples, the temperature sensors 130 are arranged within one or more zones in which the battery cells 204 are disposed in order to measure the temperature(s) of the zones. In the example shown, the temperature sensors 130 are positioned within the zone 108-1 of the battery 108. In some examples, the temperature sensors 136 are arranged within one or more zones in which the capacitor cells 206 are disposed in order to measure the temperature(s) of the zones. In the example shown, the temperature sensors 136 include temperature sensors 136-1, 136-2, 136-3, and 136-4 that are arranged in the zones 110-1, 110-2, 110-3, and 110-4, respectively, of the capacitor 110. In addition, a plurality (e.g., five) of the capacitor cells 206 are disposed in each of the zones 110-1 through 110-4.

In some examples, the cooling plate 244 defines one or more coolant channels 256 through which coolant flows. Coolant flowing through the coolant channels 256 absorbs heat from the cooling plate 244. As shown in FIG. 1C, the coolant channels 256 have an inlet 256-1 and an outlet 256-2. Coolant enters the coolant channels 256 through the inlet 256-1 and exits the coolant channels 256 through the outlet 256-2.

In the example shown, the inlet 256-1 and the outlet 256-2 are disposed at opposite ends of the cooling plate 244. Alternatively, the inlet 256-1 and the outlet 256-2 may be disposed on the same side of the cooling plate 244. In addition, the coolant channels 256 may collectively form a generally "U"-shaped channel that extends from the inlet 256-1 to the outlet 256-2, and cooling fins (not shown) may be disposed in the "U"-shaped channel. The cooling fins increase the amount of heat transfer between the cooling plate 244 and the coolant flowing through the coolant channels 256, and may separate the coolant channels 256 while allowing coolant to flow therebetween.

In some examples, the DC/DC boost converter 162 and the DC/DC buck converter 164 are in thermal contact (or a heat exchange relationship) with an outer top surface 258 of the cooling plate assembly 202. Likewise, the DC/AC converter 172 is also in thermal contact (or a heat exchange relationship) with the outer surface 258 of the cooling plate assembly 202.

A housing 260 cooperates with the cooling plate 244 to completely enclose the cell stack 208. As shown in FIG. 1E, the housing 260 has a box shape with a closed bottom 262, an open top 264, and sides 266, 268, 270, and 272. The housing 260 may be attached to the cooling plate assembly 202 by, for example, inserting fasteners through the sides 266 and 270 of the housing 260 and into the cooling plate 244, or inserting fasteners from a flange (not shown) located at the top of the sides 266, 268, 270, and 272 into the cooling plate 244. In some examples, the housing 260 is made from metal and/or plastic. In some examples, the power management module 112 is also disposed within the housing 260.

The integration of the battery 108 and the capacitor 110 within a single housing is enabled by the smaller physical size of the battery 108 relative the physical size of a conventional hybrid battery. For example, whereas a conventional hybrid battery may have a physical size associated with a capacity of 100 Ah, the battery 108 may have a physical size associated with a capacity of 17 Ah. The smaller physical size of the battery 108 is enabled by primarily using the capacitor 110 and only indirectly using the battery 108 to support higher current loads that occur during starting or e-boost events, and by limiting the discharge rate (or C-rate) of the battery 108. Additional power management details can be found in U.S. Application No. 62/302,372, filed on Mar. 2, 2016.

With continued reference to FIG. 1E, the battery and capacitor assembly 200 has a length L, a width W, and a height H. The length L extends from an exterior surface of the side 266 of the housing 260 to an exterior surface of the side 270 of the housing 260. The width W extends from an exterior surface of the side 268 of the housing 260 to an exterior surface of the side 272 of the housing 260. The height H extends from an exterior surface of the bottom 262 of the housing 260 to a top surface 274 of the housing 260 and extends around the open top 264 of the housing 260.

The dimensions of the battery and capacitor assembly 200 may be comparable to the dimensions of a conventional lead acid battery. For example, the width W may be less than or equal to 200 millimeters (mm), the height H may be less than or equal to 260 mm, and the length L may be less than or equal to 400 mm. In some examples, the width W may be in a range from 170 mm to 200 mm, the height H may be in a range from 200 mm to 260 mm, and the length L may be in a range from 300 mm to 400 mm.

The aforementioned dimensions may apply when the cells 204 and 206 are arranged with their side surfaces facing downward as shown in FIGS. 1C and 1E. Thus, if the cells 204 and 206 are arranged with their bottom surfaces facing downward, the numerical ranges for the width W and the height H may be reversed. For example, the width W may be in a range from 200 mm to 260 mm, the height H may be in a range from 170 mm to 200 mm.

The dimensions of the battery and capacitor assembly 200 may be quantified relative to the dimensions of the cells 204 and 206 of the battery 108 and the capacitor 110, respectively. For example, each of the cells 204 and 206 may have dimensions D1, D2, and D3 aligned with the width W, the height H, and the length L, respectively, of the battery and capacitor assembly 200. The dimension D1 may be in a range from 120 mm to 140 mm (e.g., 130 mm), the dimension D2 may be in a range from 145 mm to 165 mm (e.g., 140 mm), and a sum of the dimension D3 for all of the cells 204 and 206 may be in a range from 240 mm to 260 mm (e.g., 250 mm).

The width W of the battery and capacitor assembly 200 may be greater than the dimension D1 of each of the cells 204 and 206 by an amount in a range from 50 percent to 60 percent (e.g., 54 percent). The amount by which the width W is greater than the dimension D1 may provide clearance for a thickness T of the housing 260 and for the tabs 209 and 210 of the cells 204 and 206, respectively. In addition, the power management module 112 may be positioned between (1) the tabs 209 and 210 and (2) the housing 260, and the amount by which the width W is greater than the dimension D1 may provide clearance for the power management module 112.

The height H of the battery and capacitor assembly 200 may be greater than the dimension D2 of each of the cells 204 and 206 by an amount in a range from 10 percent to 20 percent (e.g., 12 percent). The amount by which the height H is greater than the dimension D2 may provide clearance for the thickness T of the housing 260. The length L of the battery and capacitor assembly 200 may be greater than a sum of the dimension D3 for all of the cells 204 and 206 by an amount in a range from 15 percent to 25 percent (e.g., 20 percent). The amount by which the length L is greater than the dimension D3 may provide clearance for the thickness T of the housing 260, for the end brackets 220, and for the tolerance stack-up of the cells 204 and 206.

The dimension D1 of the cells 204 and 206 may be aligned with the width W and the dimension D2 may be aligned with the height H when the cells 204 and 206 are arranged with their side surfaces facing downward as shown in FIGS. 1C and 1E. In contrast, if the cells 204 and 206 are arranged with their bottom surfaces facing downward, the dimension D1 of the cells 204 and 206 may be aligned with the height H and the dimension D2 may be aligned with the width W. In this case, dimension D1 may be in a range from 145 mm to 165 mm (e.g., 140 mm), and the dimension D2 may be in a range from 120 mm to 140 mm (e.g., 130 mm).

In addition, the width W may be greater than the dimension D2 of each of the cells 204 and 206 by an amount in a range from 10 percent to 20 percent (e.g., 12 percent). In addition, the height H may be greater than the dimension D1 of each of the cells 204 and 206 by an amount in a range from 50 percent to 60 percent (e.g., 54 percent).

Figure 1F:
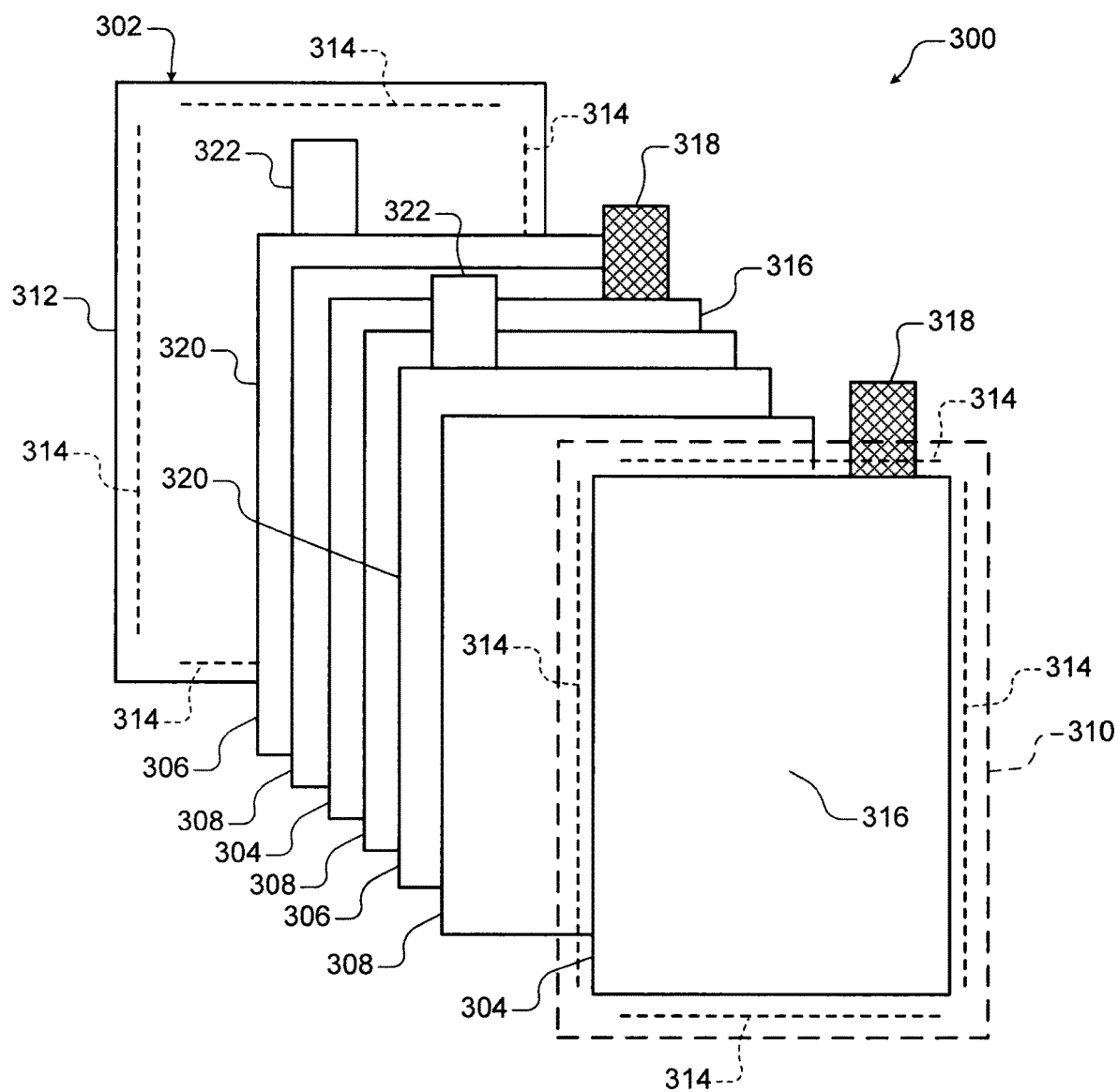
FIG. 1F is an exploded front view of an example of a battery cell or a capacitor cell according to the present disclosure.

Referring now to FIG. 1F, an example of a cell 300 having a pouch configuration is shown. The cell 300 may be representative of one of the cells 204 of the battery 108 and/or one of the cells 206 of the capacitor 110. The cell 300 includes a housing 302, first electrodes (e.g., cathodes) 304, second electrodes (e.g., anodes) 306 and separators 308 disposed adjacent ones of the first and second electrodes 304 and 306.

The housing 302 includes a first side 310 and a second side 312. During assembly, the electrodes 304 and 306 and the separators 308 may be positioned between the first and second sides 310 and 312, and the first and second sides 310 and 312 may be joined together along seams 314. In turn, the electrodes 304 and 306 and the separators 308 may be sealed within the housing 302. In some examples, the housing 302 is made from plastic, and the first and second sides 310 and 312 are jointed together along the seams 314 using adhesive and/or heat sealing.

Each of the electrodes 304 includes plate-like body 316 and a tab 318 extending from one end of the plate-like body 316. Similarly, each of the electrodes 306 includes plate-like body 320 and a tab 322 extending from one end of the plate-like body 320. The tabs 318 of the electrodes 304 may cooperate to form one of the tabs 209 or 210 of the cells 204 or 206, and the tabs 322 of the electrodes 306 may cooperate to form the other one of the tabs 209 or 210 on the same one of the cells 204 or 206.

If the cell 300 is a lithium ion battery cell, the electrodes 304 and 306 may be coated with lithium iron phosphate (LiFePO4), lithium titanate (Li4Ti5O12) (LTO), and/or other lithium ion chemistry or battery chemistry. In addition, the cell 300 may store energy electrochemically. If the cell 300 is a supercapacitor (or ultracapacitor) cell, the electrodes 304 and 306 may be made from or coated with activated carbon (AC), carbon fiber-cloth (AFC), carbide-derived carbon (CDC), carbon aerogel, graphite, graphene, graphane, carbon nanotubes (CNTs) and/or other supercapacitor chemistry. In addition, the cell 300 may store energy electrostatically on the surfaces of the electrodes 304 and 306, and the energy storage of the cell 300 may not involve chemical reactions.

When the cell 300 discharges, energy-containing ions travel from one of the electrodes 304 or 306, through the one of separators 308, and to the other one of the electrodes 304 or 306. The movement of the ions releases energy, which may be extracted into an external circuit. When the cell 300 charges, energy is used to move the ions back to the one of the electrodes 304 or 306 from which the lithium ions travelled. The separators 308 are formed from an electrically insulating material so that the separators 308 electrically insulate the electrodes 304 and 306 from one another.

Figure 2:
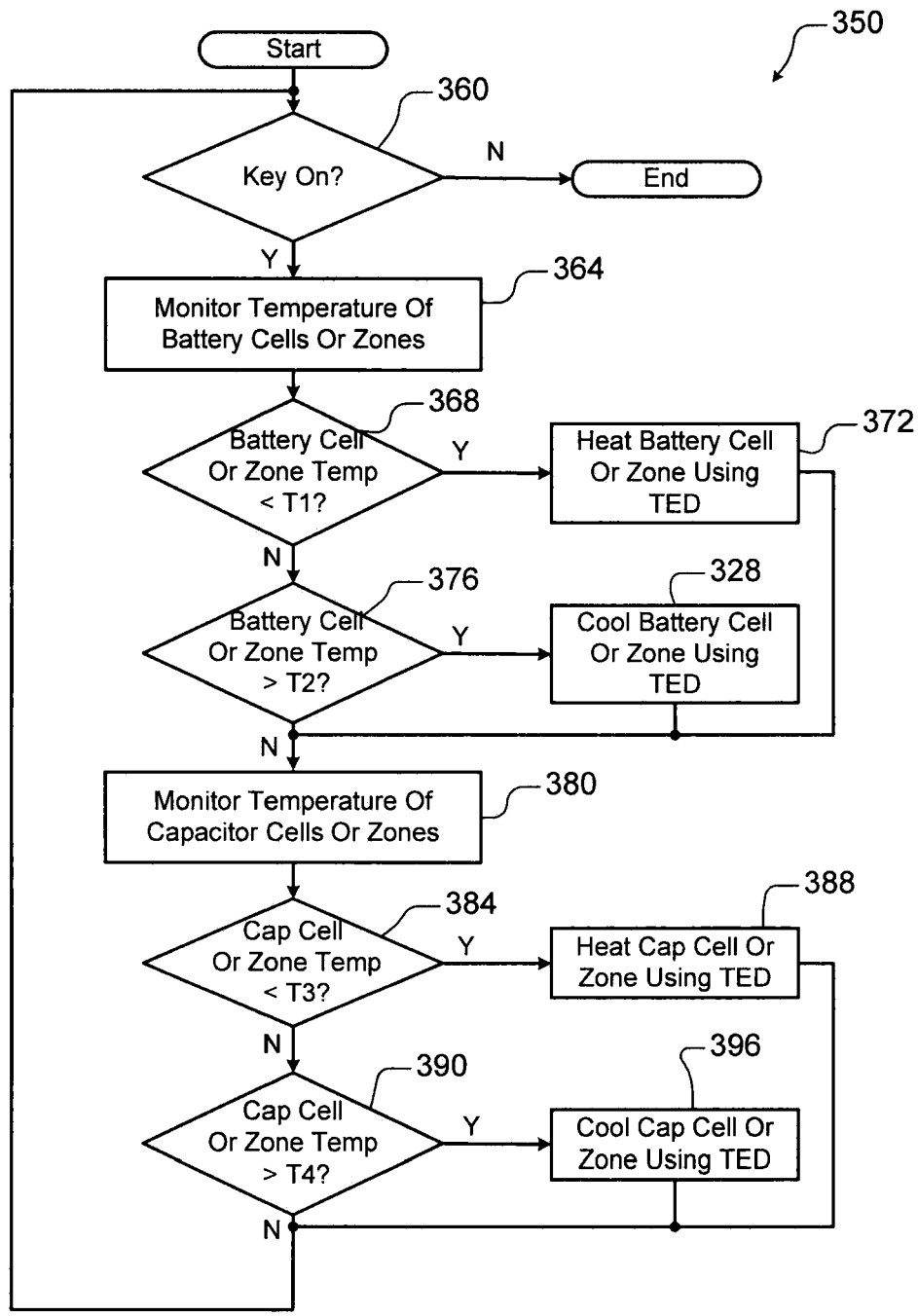
FIG. 2 is a flowchart illustrating an example of a method for controlling temperatures of the battery and the capacitor according to the present disclosure.

Referring now to FIG. 2, a method 350 for controlling the temperature of the battery 108 and the capacitor 110 during operation is shown. The method 350 is described in the context of the modules included in the example implementation of the power management module 112 shown in FIG. 1B. However, the particular modules that perform the steps of the method may be different than the modules mentioned below and/or the method may be implemented apart from the modules of FIG. 1B.

At 360, the control module 196 determines whether the key is on. When 360 is true, the control module 196 monitors the temperature of the battery cells 204 individually or monitors the temperature of one or more zones in which the battery cells 204 are disposed. In some examples, the control module 196 monitors the battery cell or zone temperature using the temperature sensors 130. At 368, the control module 196 determines whether the battery cell or zone temperature is less than a first temperature T1. If 368 is true, the control module 196 heats the corresponding battery cell or zone using the TED(s) 140. For example, the control module 196 may heat the battery cells 204 disposed in the zone 108-1 when the temperature(s) measured by the temperature sensors 130 is less than the first temperature T1.

If 368 is false, the control module 196 continues at 376 and determines whether the battery cell or zone temperature is greater than a second temperature T2. If 376 is true, the control module 196 cools the corresponding battery cell or zone using the TED(s) 140. For example, the control module 196 may cool the battery cells 204 disposed in the zone 108-1 when the temperature(s) measured by the temperature sensors 130 is greater than the second temperature T2.

The control module 196 continues from 372, 376 or 378 and monitors a temperature of capacitor cells 206 individually or monitors the temperature of one or more zones in which the capacitor cells 206 are disposed. In some examples, the control module 196 monitors the capacitor cell or zone temperature using the temperature sensors 136. At 384, the control module 196 determines whether the capacitor cell or zone temperature is less than a third temperature T3. If 384 is true, the control module 196 continues at 338 and heats the corresponding capacitor cell or zone using the TED(s) 142. For example, the control module 196 may heat the capacitor cells 206 disposed in the zone 110-1 when the temperature measured by the temperature sensor 136-1 is less the third temperature T3. Similarly, the control module 196 may heat the capacitor cells 206 disposed in the zones 110-2, 110-3, or 110-4 when the temperature measured by the temperature sensors 136-2, 136-3, or 136-4, respectively, is less the third temperature T3.

If 384 is false, the control module 196 continues at 390 and determines whether the capacitor cell or zone temperature is greater than a fourth temperature T4. If 390 is true, the control module 196 continues at 396 and cools the corresponding battery cell or zone using the TED(s) 142. For example, the control module 196 may cool the capacitor cells 206 disposed in the zone 110-1 when the temperature measured by the temperature sensor 136-1 is greater than the fourth temperature T4. Similarly, the control module 196 may heat the capacitor cells 206 disposed in the zones 110-2, 110-3, or 110-4 when the temperature measured by the temperature sensors 136-2, 136-3, or 136-4, respectively, is greater than the fourth temperature T4.

In some examples, if the battery cell temperature is less than the first temperature, the control module 196 determines whether to heat the corresponding battery cell or zone based on whether the battery 108 is charging or discharging. If the battery cell temperature is less than the first temperature when the battery 108 is charging, the control module 196 heats the corresponding battery cell or zone. If the battery cell temperature is less than the first temperature when the battery 108 is discharging, the control module 196 does not heat the corresponding battery cell or zone.

Figure 3:
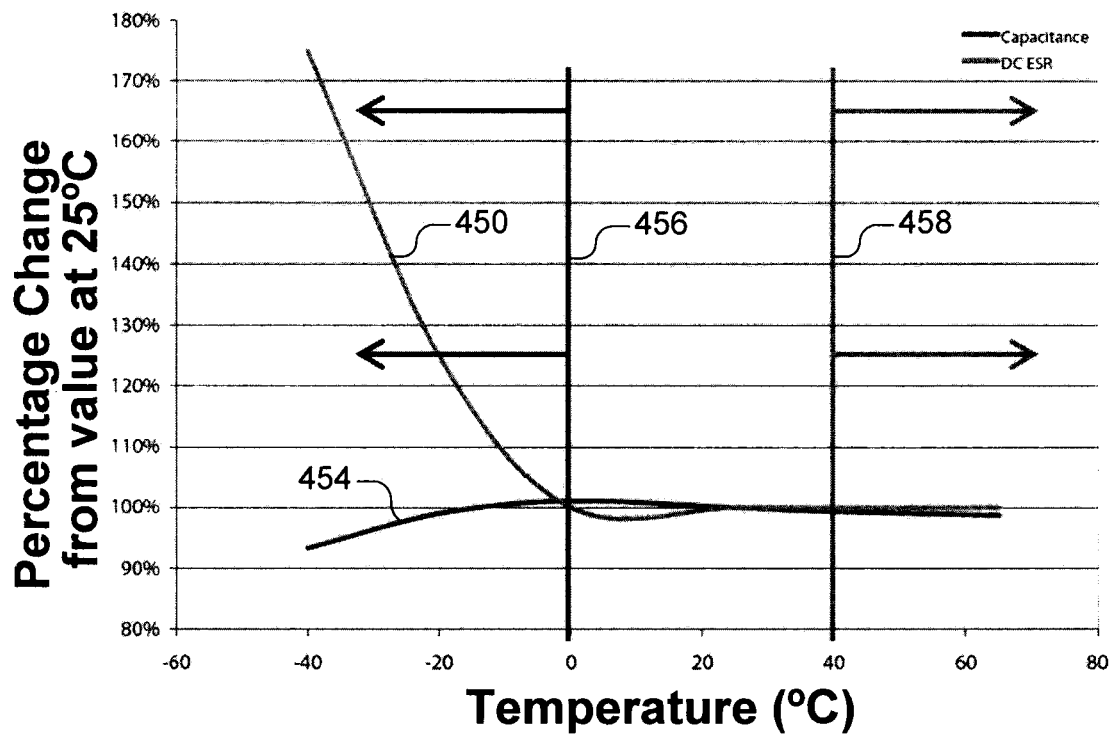
FIG. 3 is a graph illustrating DC equivalent series resistance (ESR) as a function of temperature for the capacitor.

Referring now to FIG. 3, DC equivalent series resistance (ESR) is shown at 450 and capacitance is shown at 454 as a function of temperature for the capacitor 110. Heating of the capacitor 110 above the third temperature T3 (at 456) is performed to reduce ESR at low temperatures to ensure high power and high capacity. This may be important for high power loads such as cold starting and e-boost. Cooling of the capacitor 110 below the fourth temperature T4 (at 458) is performed to improve capacitor cell life.

Figure 4:
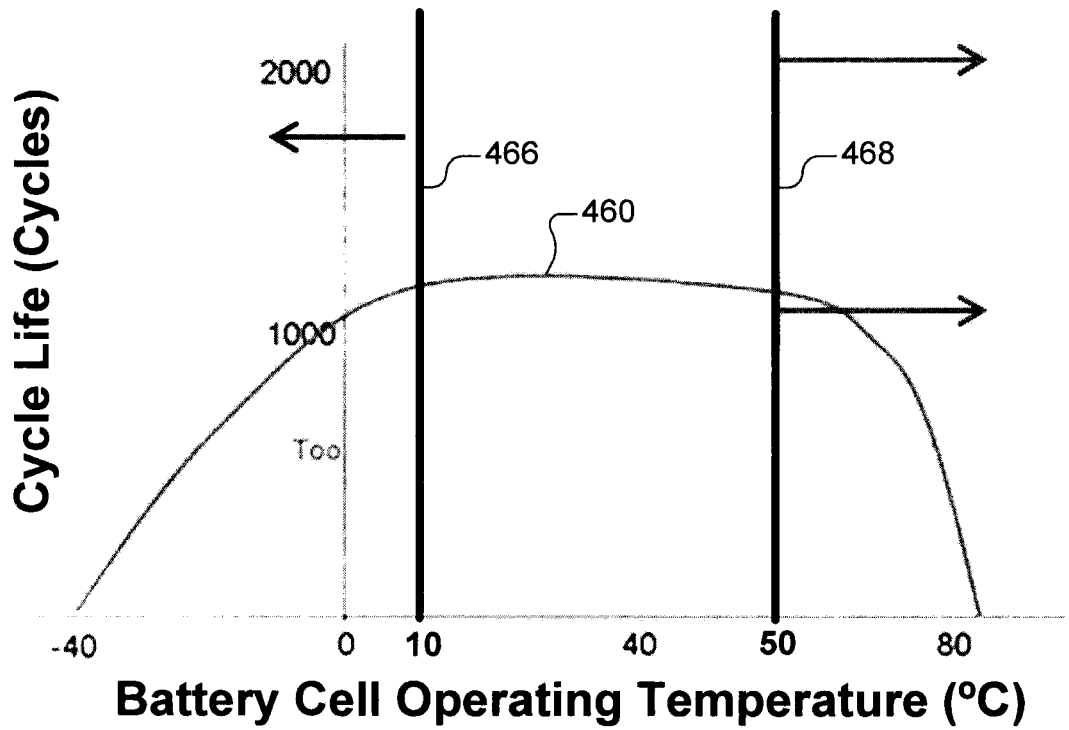
FIG. 4 is a graph illustrating cycle life as a function of cell operating temperature for the battery.

Referring now to FIG. 4, cycle life is shown at 460 as a function of cell operating temperature for the battery 108. Heating of the cells in the battery above the first temperature T1 (at 466) is performed to ensure low resistance, high power, full capacity, and long life. This may be important for high power loads such as cold starting. Cooling of the battery cells below the second temperature T2 (at 468) is performed to improve battery cell life.

In some examples, the first temperature T1 for the battery cells is different than the third temperature T3 for the capacitor cells and/or the second temperature T2 for the battery cells is different than the fourth temperature T4 for the capacitor cells. Since the TEDs are arranged in zones, different temperature ranges may be used to heat and cool the battery cells relative to the capacitor cells even though the battery cells and capacitor cells are arranged in the common assembly described above. In other examples, the first temperature T1 for the battery cells is the same as the third temperature T3 for the capacitor cells and/or the second temperature T2 for the battery cells is the same as the fourth temperature T4 for the capacitor cells.

For example, the first temperature T1 may be in a range from 5° C. to 15° C., the second temperature may be in a range from 45° C. to 55° C., the third temperature T3 may be in a range from −5° C. to 5° C., and the fourth temperature T4 may be in a range from 35° C. to 45° C., although other temperatures may be used. In another example, the first temperature T1 may be 10° C., the second temperature T2 may be 50° C., the third temperature T3 may be 0° C., and the fourth temperature may be 40° C.

In some examples, the first, second, third, and/or fourth temperatures T1, T2, T3, and/or T4 are predetermined. In some examples, the control module 196 determines the first temperature T1 and/or the second temperature T2 based on a target resistance of the battery cells 204, a target amount of power supplied by the battery cells 204, a target capacity of the battery cells 204, and/or a target life of the battery cells 204. In some examples, the control module 196 determines the third temperature T1 and/or the fourth temperature T4 based on a target resistance of the capacitor cells 206, a target amount of power supplied by the capacitor cells 206, a target capacity of the capacitor cells 206, and/or a target life of the capacitor cells 206.

In one example, the capacity of the battery cells 204 may decrease at temperatures below 20° C., and the battery cells 204 may incur irreversible damage when the battery cells 204 are charged at temperatures below −20° C. Thus, the control module 196 may set the temperature T1 to 20° C. when full battery capacity is desired. Otherwise, the control module 196 may set the temperature T1 to −20° C.

In one example, the control module 196 may determine the second temperature T2 based on a balance between the target amount of power supplied by the battery cells 204 and the target life of the battery cells 204. For example, the second temperature T2 may normally be a temperature (e.g., 50° C.) above which the life of the battery cells 204 decreases rapidly. However, if maximum battery power is desired, the control module 196 may temporarily adjust the second temperature T2 to a higher temperature (e.g., 60° C.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

As used herein, the phrase at least one of A, B, and C should be construed to mean a logical (A OR B OR C), using a non-exclusive logical OR, and should not be construed to mean "at least one of A, at least one of B, and at least one of C." Spatial and functional relationships between elements (for example, between modules, circuit elements, semiconductor layers, etc.) are described using various terms such as "connected," "adjacent," "next to," "on top of," "inner," "outer," "beneath," "below," "lower," "above," "upper," "bottom," "top," "side," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

In addition, spatially relative terms may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
an enclosure formed by a housing and a cooling plate, the housing forming a bottom wall of the enclosure and sidewalls of the enclosure, the cooling plate forming a top wall of the enclosure;
a plurality of battery cells disposed within a first zone in the enclosure;
a plurality of capacitor cells disposed within a second zone in the enclosure;
a first temperature sensor that measures the temperature of the first zone in which the plurality of battery cells are disposed;
a second temperature sensor that measures the temperature of the second zone in which the plurality of capacitor cells are disposed; and
a control module that controls an amount of at least one of current, voltage, and power supplied to a plurality of thermoelectric devices to heat and cool the plurality of battery cells based on the first zone temperature and to heat and cool the plurality of capacitor cells based on the second zone temperature and independent of heating and cooling the plurality of battery cells.

2. The system of claim 1 wherein the control module:
controls the amount of at least one of current, voltage, and power supplied to a first one of the plurality of thermoelectric devices disposed within the first zone to one of heat and cool the plurality of battery cells; and
controls the amount of at least one of current, voltage, and power supplied to a second one of the plurality of thermoelectric devices disposed within the second zone to one of heat and cool the plurality of capacitor cells.

3. The system of claim 2 wherein the control module:
heats the plurality of battery cells when the first zone temperature is less than a first temperature threshold; and
cools the plurality of battery cells when the first zone temperature is greater than a second temperature threshold.

4. The system of claim 3 wherein the control module:
heats the plurality of capacitor cells when the second zone temperature is less than a third temperature threshold; and
cools the plurality of capacitor cells when the second zone temperature is greater than a fourth temperature threshold.

5. The system of claim 4 wherein at least one of:
the third temperature threshold is different than the first temperature threshold; and
the fourth temperature threshold is different than the second temperature threshold.

6. The system of claim 5 wherein:
the third temperature threshold is less than the first temperature threshold; and
the fourth temperature threshold is less than the second temperature threshold.

7. The system of claim 4, wherein each of the first, second, third, and fourth temperature thresholds is predetermined.

8. The system of claim 4, wherein the control module:
determines the first temperature threshold based on at least one of a target resistance of the plurality of battery cells, a target amount of power supplied by the plurality of battery cells, and a target capacity of the plurality of battery cells; and
determines the third temperature threshold based on at least one of a target resistance of the plurality of capacitor cells, a target amount of power supplied by the plurality of capacitor cells, and a target capacity of the plurality of capacitor cells for a single discharge cycle.

9. The system of claim 8 wherein the control module:
determines the first temperature threshold based on the target capacity of the plurality of battery cells when the target capacity of the plurality of battery cells is equal to a maximum capacity; and
does not determine the first temperature threshold based on the target capacity of the plurality of battery cells when the target capacity of the plurality of battery cells is less than the maximum capacity.

10. The system of claim 8 wherein the control module:
adjusts the first temperature threshold to a first value to maintain the capacity of the plurality of battery cells at a maximum capacity when the target capacity of the plurality of battery cells is equal to the maximum capacity; and
adjusts the first temperature threshold to a second value to prevent damage to the plurality of battery cells when the target capacity of the plurality of battery cells is less than the maximum capacity, the second value being less than the first value.

11. The system of claim 4 wherein the control module:
determines the second temperature threshold based on at least one of a target resistance of the plurality of battery cells, a target amount of power supplied by the plurality of battery cells, and a target capacity of the plurality of battery cells; and
determines the fourth temperature threshold based on at least one of a target resistance of the plurality of capacitor cells, a target amount of power supplied by the plurality of capacitor cells, and a target capacity of the plurality of capacitor cells for a single discharge cycle.

12. The system of claim 4 wherein the control module determines the second temperature threshold based on at least one of a target amount of power supplied by the plurality of battery cells and a target life of the plurality of battery cells.

13. The system of claim 12 wherein the control module:
adjusts the second temperature threshold to a first value when the target amount of power of the plurality of battery cells is less than a maximum power amount; and
adjusts the second temperature threshold to a second value when the target amount of power of the plurality of battery cells is equal to the maximum power amount, the second value being greater than the first value.

14. The system of claim 1 wherein the control module:
heats the plurality of battery cells when the first zone temperature is less than a first temperature threshold if the plurality of battery cells are charging; and
does not heat the plurality of battery cells when the first zone temperature is less than the first temperature threshold if the plurality of battery cells are discharging.

15. A method comprising:
enclosing a plurality of battery cells and a plurality of capacitor cells within a common enclosure formed by a housing and a cooling plate, the plurality of battery cells being disposed within a first zone of the enclosure, the plurality of capacitor cells being disposed within a second zone of the enclosure, the housing forming a bottom wall of the enclosure and sidewalls of the enclosure, the cooling plate forming a top wall of the enclosure, the cooling plate isolating the plurality of battery cells and the plurality of capacitor cells from cooling fluid flowing through the cooling plate;
measuring the temperature of the first zone in which the plurality of battery cells are disposed;
measuring the temperature of the second zone in which the plurality of capacitor cells are disposed; and
controlling an amount of at least one of current, voltage, and power supplied to a plurality of thermoelectric devices to heat and cool the plurality of battery cells based on the first zone temperature and to heat and cool the plurality of capacitor cells based on the second zone temperature and independent of heating and cooling the plurality of battery cells.

16. The method of claim 15 further comprising:
controlling the amount of at least one of current, voltage, and power supplied to a first one of the plurality of thermoelectric devices disposed within the first zone to one of heat and cool the plurality of battery cells; and
controlling the amount of at least one of current, voltage, and power supplied to a second one of the plurality of thermoelectric devices disposed within the second zone to one of heat and cool the plurality of capacitor cells.

17. The method of claim 16 further comprising:
heating the plurality of battery cells when the first zone temperature is less than a first temperature threshold; and
cooling the plurality of battery cells when the first zone temperature is greater than a second temperature threshold.

18. The method of claim 17 further comprising:
heating the plurality of capacitor cells when the second zone temperature is less than a third temperature threshold; and
cooling the plurality of capacitor cells when the second zone temperature is greater than a fourth temperature threshold.

19. The method of claim 18 wherein at least one of:
the third temperature threshold is different than the first temperature threshold; and
the fourth temperature threshold is different than the second temperature threshold.

20. The method of claim 19 wherein:
the third temperature threshold is less than the first temperature threshold; and
the fourth temperature threshold is less than the second temperature threshold.

21. The method of claim 18, wherein each of the first, second, third, and fourth temperature thresholds is predetermined.

22. The method of claim 18, further comprising:
determining the first temperature threshold based on at least one of a target resistance of the plurality of battery cells, a target amount of power supplied by the plurality of battery cells, and a target capacity of the plurality of battery cells; and
determining the third temperature threshold based on at least one of a target resistance of the plurality of capacitor cells, a target amount of power supplied by the plurality of capacitor cells, and a target capacity of the plurality of capacitor cells for a single discharge cycle.

23. The method of claim 22 further comprising:
determining the first temperature threshold based on the target capacity of the plurality of battery cells when the target capacity of the plurality of battery cells is equal to a maximum capacity; and
not determining the first temperature threshold based on the target capacity of the plurality of battery cells when the target capacity of the plurality of battery cells is less than the maximum capacity.

24. The method of claim 22 further comprising:
adjusting the first temperature threshold to a first value to maintain the capacity of the plurality of battery cells at a maximum capacity when the target capacity of the plurality of battery cells is equal to the maximum capacity; and
not adjusting the first temperature threshold to a second value to prevent damage to the plurality of battery cells when the target capacity of the plurality of battery cells is less than the maximum capacity, the second value being less than the first value.

25. The method of claim 18 further comprising:
determining the second temperature threshold based on at least one of a target resistance of the plurality of battery cells, a target amount of power supplied by the plurality of battery cells, and a target capacity of the plurality of battery cells; and
determining the fourth temperature threshold based on at least one of a target resistance of the plurality of capacitor cells, a target amount of power supplied by the plurality of capacitor cells, and a target capacity of the plurality of capacitor cells for a single discharge cycle.

26. The method of claim 18 further comprising determining the second temperature threshold based on at least one of a target amount of power supplied by the plurality of battery cells and a target life of the plurality of battery cells.

27. The method of claim 26 further comprising:
adjusting the second temperature threshold to a first value when the target amount of power of the plurality of battery cells is less than a maximum power amount; and
adjusting the second temperature threshold to a second value when the target amount of power of the plurality of battery cells is equal to the maximum power amount, the second value being greater than the first value.

28. The method of claim 16, further comprising:
heating the plurality of battery cells when the first zone temperature is less than a first temperature threshold if the plurality of battery cells are charging; and
not heating the plurality of battery cells when the first zone temperature is less than the first temperature threshold if the plurality of battery cells are discharging.

* * * * *